(12) United States Patent
Lichtenau et al.

(10) Patent No.: US 12,314,755 B2
(45) Date of Patent: May 27, 2025

(54) SCHEDULING A SECURE CODE SEGMENT ON A PROCESSOR CORE OF A PROCESSING UNIT

(71) Applicant: INTERNATIONAL BUSINESS MACHINES CORPORATION, Armonk, NY (US)

(72) Inventors: Cedric Lichtenau, Stuttgart (DE); Jakob Christopher Lang, Walddorfhäslach (DE); Eberhard Pasch, Tuebingen (DE); Christian Borntraeger, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 17/457,449

(22) Filed: Dec. 3, 2021

(65) Prior Publication Data

US 2023/0176901 A1 Jun. 8, 2023

(51) Int. Cl.
*G06F 9/455* (2018.01)
*G06F 9/48* (2006.01)
*G06F 21/53* (2013.01)

(52) U.S. Cl.
CPC ........ *G06F 9/4881* (2013.01); *G06F 9/45558* (2013.01); *G06F 21/53* (2013.01);
(Continued)

(58) Field of Classification Search
CPC .... G06F 9/4881; G06F 9/45558; G06F 21/53; G06F 2009/45587; G06F 2009/033
See application file for complete search history.

(56) References Cited

U.S. PATENT DOCUMENTS 7,707,578 B1 4/2010 Zedlewski
8,219,996 B1 7/2012 Morris
(Continued)

FOREIGN PATENT DOCUMENTS

CN 109858288 B 4/2021
CN 112800431 A 5/2021
(Continued)

OTHER PUBLICATIONS

Author Unknown, "AMD SEV-SNP: Strengthening VM Isolation with Integrity Protection and More," Advanced Micro Devices, Jan. 2020, https://www.amd.com/system/files/TechDocs/SEV-SNP-strengthening-vm-isolation-with-integrity-protection-and-more.pdf, 20 pages.
(Continued)

*Primary Examiner* — Diem K Cao
(74) *Attorney, Agent, or Firm* — Elliot J. Shine

(57) ABSTRACT

A computer-implemented method, computer system and a computer program product schedule a secure code segment on a processor core of a processing unit between threads, wherein the processing unit is executing a program code of operating instructions of a thread on the at least one processor core. The method comprises a first thread requesting exclusive secure execution of a secure code segment of the program code on the at least one processor core. The method also comprises checking the request based on a secure-operation parameter that controls a request for exclusive secure execution of a secure code segment. The method further comprises, if the secure-operation parameter is below a predefined threshold value, setting the at least one processor core to exclusive secure execution for the secure code segment and periodically resetting the secure-operation parameter. If the secure-operation parameter is not below the threshold, then the method switches to another thread.

23 Claims, 3 Drawing Sheets

FIG. 1

(52) U.S. Cl.
CPC .............. *G06F 2009/45587* (2013.01); *G06F 2221/033* (2013.01)

(56) References Cited

U.S. PATENT DOCUMENTS

| | | | |
|---|---|---|---|
| 10,068,109 B2* | 9/2018 | Coker | .................... G06F 21/78 |
| 10,417,048 B2 | 9/2019 | Zedlewski | |
| 11,392,405 B2 | 7/2022 | Liu et al. | |
| 2008/0271027 A1 | 10/2008 | Norton | |
| 2009/0031314 A1 | 1/2009 | Moscibroda | |
| 2009/0172369 A1 | 7/2009 | Stillwell, Jr. | |
| 2009/0292931 A1 | 11/2009 | Henry et al. | |
| 2012/0147937 A1 | 6/2012 | Goss | |
| 2014/0230077 A1 | 8/2014 | Muff | |
| 2016/0124719 A1 | 5/2016 | Chandaria | |
| 2016/0232005 A1 | 8/2016 | Duale | |
| 2016/0234019 A1 | 8/2016 | Goss | |
| 2016/0259644 A1 | 9/2016 | Brandt et al. | |
| 2017/0140153 A1 | 5/2017 | Zimmer | |
| 2018/0268130 A1 | 9/2018 | Ghosh | |
| 2019/0034357 A1 | 1/2019 | Nunez Mencias | |
| 2021/0173651 A1 | 6/2021 | Mukherjee | |
| 2021/0173657 A1 | 6/2021 | Mukherjee | |
| 2022/0066809 A1 | 3/2022 | Liu et al. | |

FOREIGN PATENT DOCUMENTS

| | | | |
|---|---|---|---|
| DE | 102015213263 A1 | 1/2017 | |
| EP | 34623621 A | 4/2019 | |

OTHER PUBLICATIONS

Disclosed Anonymously, "Heuristic Real-Time Scheduling in Virtual Machine Monitor," IP.com, IP.com No. IPCOM000222184D, IP.com Publication Date: Sep. 24, 2012, 4 pages.

Townley et al., "SMT-COP: Defeating Side-Channel Attacks on Execution Units in SMT Processors," 2019 28th International Conference on Parallel Architectures and Compilation Techniques (PACT), 2019 IEEE, pp. 43-54.

International Searching Authority, "Notification of International Search Report and Written Opinion or Declaration", International Application No. PCT/EP2022/081210, Mailed Feb. 9, 2023, 13 pages.

Schaffer, et al., "The Joy of Scheduling", QNX Software Systems, Jan. 1, 2011, pp. 1-12, XP093019561, Retrieved from the Internet: URL: http://www.qnx.com/content/dam/qnx/whitepapers/2011/qnx_joy_of_scheduling.pdf, [retrieved on Jan. 31, 2023].

IBM, List of IBM Patents or Patent Applications Treated as Related, Appendix P, dated Feb. 9, 2023, 2 pages.

Pending U.S. Appl. No. 17/457,446, filed Dec. 3, 2021, entitled, "Operating a Secure Code Segment on a Processor Core of a Processing Unit", 32 pages.

International Searching Authority, "Notification of International Search Report and Written Opinion or Declaration", International Application No. PCT/EP2022/081213, Mailed Feb. 8, 2023, 11 pages.

Notices of References, mailed May 2, 2024, U.S. Appl. No. 17/457,446.

* cited by examiner

SCHEDULING A SECURE CODE SEGMENT ON A PROCESSOR CORE OF A PROCESSING UNIT

BACKGROUND

The present invention relates in general to data processing systems, in particular, to a computer implemented method, a computer system, a computer program product and a data processing system for scheduling a secure code segment on a processor core of a processing unit.

Multi-threaded processors may include a plurality of hardware threads that can execute concurrently. One example of a multi-threaded processor may be a simultaneous multithreaded (SMT) processor. In simultaneous multithreading, instructions from more than one thread can be executing in any given instruction pipeline stage at a time. Thus, simultaneous multithreading may allow multiple independent threads of execution to better utilize the resources provided by the processor architecture. Simultaneous multithreading may make each processor of a virtual machine appear as n-processors, called threads, to applications.

Processes or threads from different customers in the cloud or on premise may be virtualized on a virtual machine (VM) or on a container and may run on the same physical core. It is common to request for the thread to run in single-threaded mode.

One implementation of a pipeline for secure multithread execution may be an integrated circuit for executing instructions that includes: a processor pipeline configured to execute instructions from two or more threads in parallel using execution units of the processor pipeline; and a thread hazard circuitry configured to detect that an instruction of a first thread has been designated as a sensitive instruction, and, responsive to detection of the sensitive instruction, block instructions of threads other than the first thread from being executed using execution units of processor pipeline while the sensitive instruction is being executed by an execution unit of the processor pipeline.

In this implementation, just single instructions may be protected verifying that the architected state of a thread is isolated, whereas the non-architected state may not be considered.

Permanently reserving a core for all secure work can be done but this may effectively reduce the overall processor performance if not doing the whole-time secure work. Further, it does not scale if a large portion of the work on the computer system requests a secure environment to execute.

SUMMARY

A computer-implemented method is proposed for scheduling a secure code segment on a processor core of a processing unit between threads, wherein the processing unit is configured with at least one processor core for running a first execution mode for executing program code on the at least one processor core and executing a program code of operating instructions of a thread on the at least one processor core. A secure-operation parameter is defined for at least one of the threads controlling a request for exclusive secure execution of a secure code segment of the program code on the at least one processor core. The method at least comprises: requesting, by a first thread, exclusive secure execution of a secure code segment of the program code on the at least one processor core; checking the request based on the secure-operation parameter; setting the at least one processor core to exclusive secure execution for the secure code segment when the secure-operation parameter is below a predefined threshold value; executing the secure code segment on the at least one processor core uninterruptably; wiping an architected state and a non-architected state from the at least one processor core; increasing the secure-operation parameter of the first thread at least based on the uninterrupted secure execution time of the first thread; setting the at least one processor core to the first execution mode for executing program code on the at least one processor core; periodically resetting the secure-operation parameter; switching to another thread when the secure-operation parameter is greater than the predefined threshold value.

According to the proposed method, scheduling a secure code segment on a processor core of a processing unit is provided. Thus, a secure execution of a code segment on a shared physical core is provided for the code segment requesting execution in a secure container or in secure execution mode that cost large context switch time and potentially block the processor core for a longer period of time. This comprises a hardware circuit and/or a hypervisor code checking that the thread requesting secure context execution has sufficient priority and if not, not changing to the exclusive secure execution but switching to another thread or switching back to the scheduler. A hardware circuit and/or hypervisor code updates the priority of the thread when exiting the exclusive secure execution.

A secure code segment may request an exclusive secure context for at least a minimum time and/or a minimum count of operating instructions. This comprises, under hardware control, at least securely setting the physical core to an exclusive secure mode, executing without interruption for a minimum time and/or number of operating instructions and finally wiping out at least an architected and non-architected state from a cache storage or a register or a memory of the physical core when finishing the secure code segment or taking any interruption after the initial period of time and/or number of operating instructions.

Advantageously, interferences between different code segments in the processor core may be avoided. A number of failures during execution of the code segments may be reduced. Further, a performance of a computer system may favorably be enhanced by the proposed method of scheduling a secure operation of a secure code segment in the processor core.

Due to an embodiment of the invention, additionally or alternatively, the secure-operation parameter of other threads except the first thread may be decreased, when the secure-operation parameter is below the predefined threshold value, at least based on the uninterrupted secure execution time of the first thread. The secure-operation parameter as a kind of priority counter takes into account the uninterrupted secure execution time of the first thread. Alternatively, the secure-operation parameter may also be implemented as a counter taking into account a number of secure execution events by the same thread. Priority of the thread may thus be reduced if the thread has been executing for a longer time period on the processor core. So, after execution of the thread has finished the priority of the first thread is decreased which means that the priority of the other threads is increased by decreasing their secure-operation parameter.

Due to an embodiment of the invention, additionally or alternatively, the secure-operation parameter of all threads may be decreased in periodic time intervals. Thus, the chances for each thread may be enhanced that it would get priority to successful request of an exclusive secure execution on an equal manner basis. Periodic time intervals may be minutes.

Due to an embodiment of the invention, additionally or alternatively, the secure-operation parameter of the first thread may be updated after exiting the exclusive secure execution mode under hardware control. The secure-operation parameter can be reduced by an amount uninterrupted secure execution time, or, if the secure-operation parameter is implemented as a counter, by a number of secure execution events. Favorably, the risk of software failures followed by improper scheduling may be reduced.

Due to an embodiment of the invention, additionally or alternatively, the secure-operation parameter of the first thread may be updated after exiting the exclusive secure execution mode by a hypervisor code. Administration of the secure-operation parameter may advantageously be performed by a hypervisor.

Due to an embodiment of the invention, additionally or alternatively, it may be decided about the request for exclusive secure execution of a secure code segment of the program code on the at least one processor core at least based on the secure-operation parameter and/or a duration of the exclusive secure execution requested. Thus, not only the actual priority situation of the secure-operation parameter may be taken into account but also an estimated execution time in the exclusive secure execution mode to decide if the request of a thread is granted or not.

Due to an embodiment of the invention, additionally or alternatively, the secure-operation parameter may be implemented as a priority parameter of the thread. The secure-operation parameter as a kind of priority counter may take into account the uninterrupted secure execution time of the first thread. Alternatively, the secure-operation parameter may also be implemented as a counter taking into account a number of secure execution events by the same thread. Advantageously, a priority of each thread may be defined for getting a request for exclusive secure execution to be granted.

Due to an embodiment of the invention, additionally or alternatively, the secure-operation parameter may be implemented based on a counter of exclusive secure executions of a thread. Thus, a number of finished exclusive secure executions may control a priority of a thread for getting a request for exclusive secure execution to be granted.

Due to an embodiment of the invention, additionally or alternatively, the first execution mode of the processor core may be a simultaneous multithreading mode. Simultaneous multithreading allows multiple independent threads of execution to better utilize the resources provided by the processor architecture and is a normal execution mode of a usual processor core.

Due to an embodiment of the invention, additionally or alternatively, operating instructions may be implemented on a virtual machine or in a container. Processes/threads running on the same physical core from different customers in the cloud or on premise may favorably be virtualized on a virtual machine or on a container.

Due to an embodiment of the invention, additionally or alternatively, exclusive secure execution of a secure code segment of the program code may be requested on a virtual machine or in a container. Processes or threads running on the same physical core from different customers in the cloud or on premise may favorably be virtualized on a virtual machine or on a container. Therefore, also requests for exclusive secure execution of a secure code segment of the program code may thus be directed to a virtual machine or to a container.

Further, a computer system is proposed for scheduling a secure code segment on a processor core of a processing unit between threads, wherein the processing unit is configured with at least one processor core. The computer system comprises at least one processor unit with at least one processor core, the processor core being configured to running a first execution mode for executing program code on the at least one processor core and executing a program code of operating instructions of a thread on the at least one processor core. A secure-operation parameter is defined for at least one of the threads controlling a request for exclusive secure execution of a secure code segment of the program code on the at least one processor core.

The computer system is configured to perform a method, at least comprising: a first thread requesting exclusive secure execution of a secure code segment of the program code on the at least one processor core; checking the request based on the secure-operation parameter; setting the at least one processor core to exclusive secure execution for the secure code segment when the secure-operation parameter is below a predefined threshold value; executing the secure code segment on the at least one processor core uninterruptably; wiping an architected state and a non-architected state from the at least one processor core; increasing the secure-operation parameter of the first thread at least based on the uninterrupted secure execution time of the first thread; setting the at least one processor core to the first execution mode for executing program code on the at least one processor core; periodically resetting the secure-operation parameter; switching to another thread when the secure-operation parameter is greater than the predefined threshold value.

On the proposed computer system, scheduling a secure operation of a secure code segment on a processor core of a processing unit is provided. Thus, a secure execution of a code segment on a shared physical core is provided for the code segment requesting execution in a secure container or in secure execution mode that cost large context switch time and potentially block the processor core for a longer period of time. This comprises a hardware circuit and/or a hypervisor code checking that the thread requesting secure context execution has sufficient priority and if not, not changing to the exclusive secure execution but switching to another thread or switching back to the scheduler. A hardware circuit and/or hypervisor code updates the priority of the thread when exiting the exclusive secure execution.

A secure code segment may request an exclusive secure context for at least a minimum time and/or a minimum count of operating instructions. This comprises, under hardware control, at least securely setting the physical core to an exclusive secure mode, executing without interruption for a minimum time and/or number of operating instructions and finally wiping out at least an architected state and a non-architected state from a cache storage or a register or a memory of the physical core when finishing the secure code segment or taking any interruption after the initial period of time and/or number of operating instructions.

Advantageously interferences between different code segments in the processor core may be avoided. A number of failures during execution of the code segments may be reduced. Further a performance of a computer system may favorably be enhanced by the proposed method of scheduling a secure operation of a secure code segment in the processor core.

Due to an embodiment of the invention, additionally or alternatively, the computer system may be configured to decrease the secure-operation parameter of other threads except the first thread at least based on the uninterrupted secure execution time of the first thread. The secure-operation parameter as a kind of priority counter takes into account the uninterrupted secure execution time of the first thread. Alternatively, the secure-operation parameter may also be implemented as a counter taking into account a number of secure execution events by the same thread. Priority of the thread may thus be reduced if the thread has been executing for a longer time period on the processor core. So, after execution of the thread has finished the priority of the first thread is decreased which means that the priority of the other threads is increased by decreasing their secure-operation parameter.

Due to an embodiment of the invention, additionally or alternatively, the computer system may be configured to decrease the secure-operation parameter of all threads in periodic time intervals. Thus, the chances for each thread may be enhanced that it would get priority to a successful request of an exclusive secure execution on an equal manner basis. Periodic time intervals may be minutes.

Due to an embodiment of the invention, additionally or alternatively, the computer system may be configured to update the secure-operation parameter of the first thread after exiting the exclusive secure execution mode under hardware control. The secure-operation parameter can be reduced by an amount uninterrupted secure execution time, or, if the secure-operation parameter is implemented as a counter, by a number of secure execution events. Favorably, the risk of software failures followed by improper scheduling may be reduced.

Due to an embodiment of the invention, additionally or alternatively, the computer system may be configured to update the secure-operation parameter of the first thread after exiting the exclusive secure execution mode by a hypervisor code. Administration of the secure-operation parameter may advantageously be performed by a hypervisor.

Due to an embodiment of the invention, additionally or alternatively, the computer system may be configured to decide about the request for exclusive secure execution of a secure code segment of the program code on the at least one processor core at least based on the secure-operation parameter and/or a duration of the exclusive secure execution requested. Thus, not only the actual priority situation of the secure-operation parameter may be taken into account but also an estimated execution time in the exclusive secure execution mode to decide if the request of a thread is granted or not.

Due to an embodiment of the invention, additionally or alternatively, the secure-operation parameter may be implemented as a priority parameter of the thread. The secure-operation parameter as a kind of priority counter may take into account the uninterrupted secure execution time of the first thread. Alternatively, the secure-operation parameter may also be implemented as a counter taking into account a number of secure execution events by the same thread. Advantageously a priority of each thread may be defined for getting a request for exclusive secure execution to be granted.

Due to an embodiment of the invention, additionally or alternatively, the secure-operation parameter may be implemented based on a counter of exclusive secure executions of a thread. Thus, a number of finished exclusive secure executions may control a priority of a thread for getting a request for exclusive secure execution to be granted.

Due to an embodiment of the invention, additionally or alternatively, the first execution mode of the processor core may be a simultaneous multithreading mode. Simultaneous multithreading allows multiple independent threads of execution to better utilize the resources provided by the processor architecture and is a normal execution mode of a usual processor core.

Due to an embodiment of the invention, additionally or alternatively, operating instructions may be implemented on a virtual machine or in a container. Processes/threads running on the same physical core from different customers in the cloud or on premise may favorably be virtualized on a virtual machine or on a container.

Due to an embodiment of the invention, additionally or alternatively, the computer system may be configured to request exclusive secure execution of a secure code segment of the program code on a virtual machine or in a container. Processes/threads running on the same physical core from different customers in the cloud or on premise may favorably be virtualized on a virtual machine or on a container. Therefore, also requests for exclusive secure execution of a secure code segment of the program code may thus be directed to a virtual machine or to a container.

Further, a favorable computer program product is proposed for scheduling a secure code segment on a processor core of a processing unit between threads, wherein the processing unit is configured with at least one processor core for running a first execution mode for executing program code on the at least one processor core and executing a program code of operating instructions of a thread on the at least one processor core. A secure-operation parameter is defined for at least one of the threads controlling a request for exclusive secure execution of a secure code segment of the program code on the at least one processor core.

The computer program product comprises a computer readable storage medium having program instructions embodied therewith, the program instructions executable by the computer system to cause the computer system to perform a method comprising: a first thread requesting exclusive secure execution of a secure code segment of the program code on the at least one processor core; checking the request based on the secure-operation parameter; setting the at least one processor core to exclusive secure execution for the secure code segment when the secure-operation parameter is below a predefined threshold value; executing the secure code segment on the at least one processor core uninterruptably; wiping an architected state and a non-architected state from the at least one processor core; increasing the secure-operation parameter of the first thread at least based on the uninterrupted secure execution time of the first thread or, decreasing a secure-operation parameter of other threads except the first thread at least based on the uninterrupted secure execution time of the first thread, if the secure-operation parameter is greater than the predefined threshold value; setting the at least one processor core to the first execution mode for executing program code on the at least one processor core; periodically resetting the secure-operation parameter; switching to another thread when the secure-operation parameter is greater than the predefined threshold value.

Further, a data processing system for execution of a data processing program is proposed, comprising computer readable program instructions for performing the method described above.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

Figure 1:
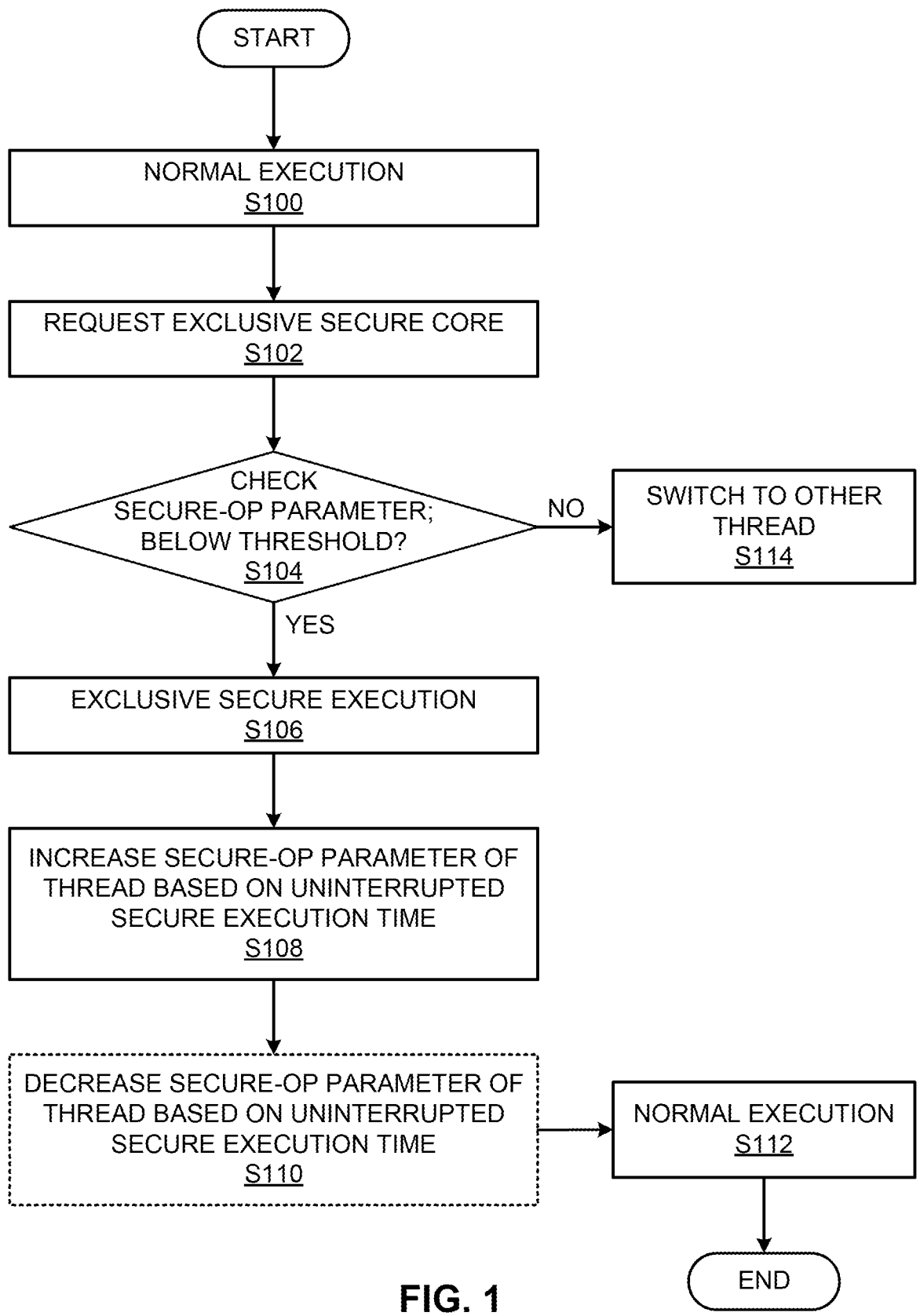
FIG. 1 depicts a flow chart of a computer implemented method for scheduling a secure code segment on a processor core of a processing unit between threads according to an embodiment of the invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a computer system for scheduling a secure code segment on a processor core of a processing unit between threads, wherein the processing unit is configured with at least one processor core. The computer system comprises at least one processor unit with at least one processor core, the processor core being configured to running a first execution mode for executing program code on the at least one processor core and executing a program code of operating instructions of a thread on the at least one processor core. A secure-operation parameter is defined for at least one of the threads controlling a request for exclusive secure execution of a secure code segment of the program code on the at least one processor core.

The illustrative embodiments may further be used for a method, at least comprising: (i) a first thread requesting exclusive secure execution of a secure code segment of the program code on the at least one processor core; (ii) checking the request based on the secure-operation parameter; (iii) if the secure-operation parameter is below a predefined threshold value; (iii.1) setting the at least one processor core to exclusive secure execution for the secure code segment; (iii.2) executing the secure code segment on the at least one processor core uninterruptably; (iii.3) wiping an architected and non-architected state from the at least one processor core; (iii.4) increasing the secure-operation parameter of the first thread at least based on the uninterrupted secure execution time of the first thread or, decreasing a secure-operation parameter of other threads except the first thread at least based on the uninterrupted secure execution time of the first thread, if the secure-operation parameter is greater than the predefined threshold value; (iii.5) setting the at least one processor core to the first execution mode for program code on the at least one processor core; (iii.6) periodically resetting the secure-operation parameter; else switching to another thread.

Figure 3:
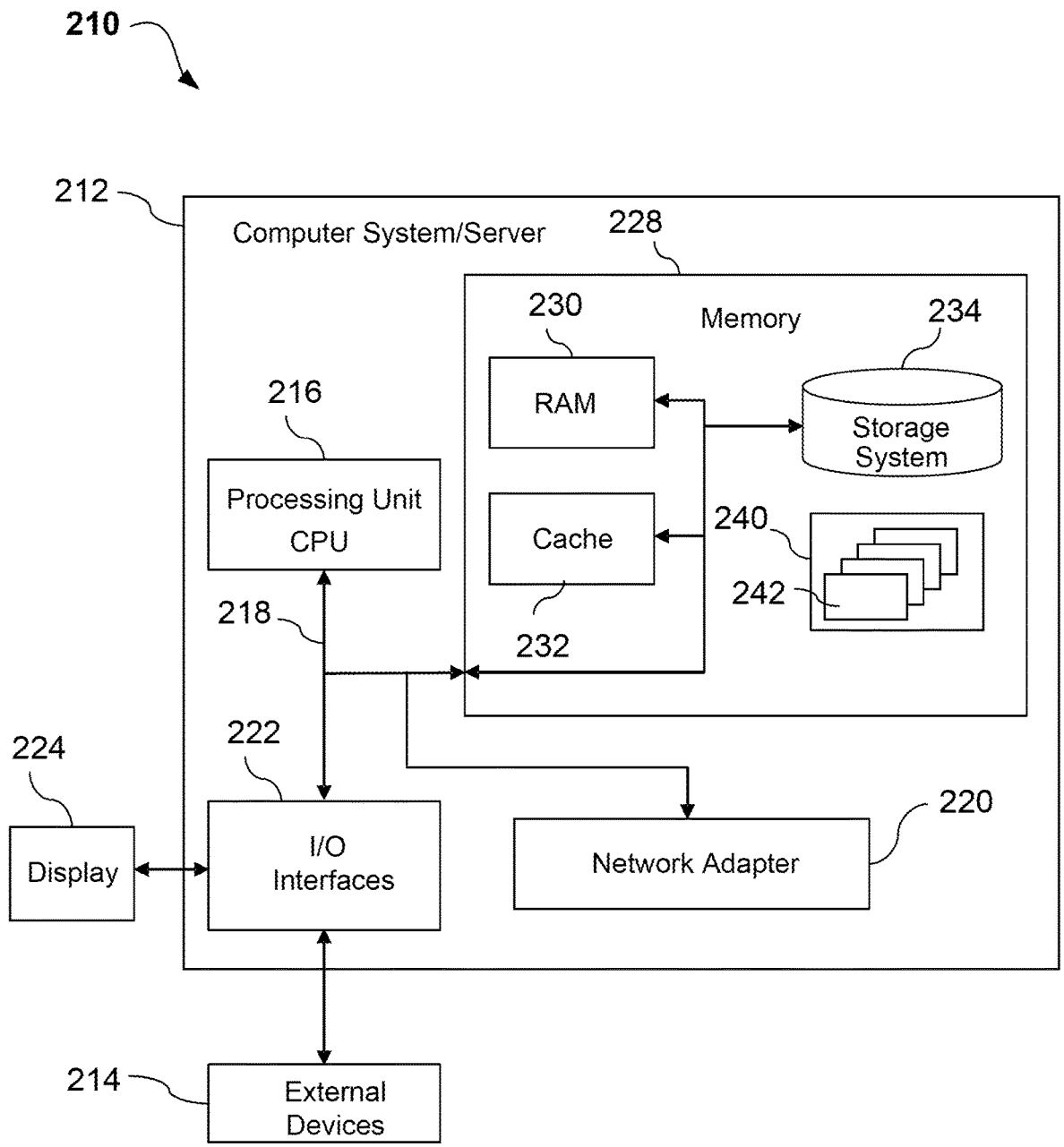
FIG. 3 depicts an example embodiment of a data processing system for executing a method according to the invention.

FIG. 1 depicts a flow chart of a computer implemented method for scheduling a secure code segment on a processor core of a processing unit 216 between threads, as depicted in FIG. 3, according to an embodiment of the invention.

The processing unit 216 is configured with at least one processor core for running a first execution mode for executing program code on the at least one processor core. A program code of operating instructions of a thread is executed on the at least one processor core in a first execution mode as a normal execution.

The first execution mode of the processor core may be a simultaneous multithreading mode. Simultaneous multithreading allows multiple independent threads of execution to better utilize the resources provided by the processor architecture and is a normal execution mode of a usual processor core.

Operating instructions may be implemented on a virtual machine or on a container. Processes/threads running on the same physical core from different customers in the cloud or on premise may favorably be virtualized on a virtual machine or in a container.

According to the proposed method, a secure-operation parameter is defined for at least one of the threads controlling a request for exclusive secure execution of a secure code segment of the program code on the at least one processor core. The secure-operation parameter serves as a priority parameter of the thread. For example, the secure-operation parameter may be implemented based on a counter of exclusive secure executions of a thread.

In step S100 of the process flow depicted in FIG. 1, a program code of operating instructions of a thread is executed on the at least one processor core in the first execution mode as a normal execution mode of the processor core.

In step S102, a first thread requests exclusive secure execution of a secure code segment of the program code on the at least one processor core. Requesting exclusive secure execution of the secure code segment of the program code may be done on a virtual machine or in a container, depending on the configuration of the computer system 212.

Next, in step S104, the request is checked based on the secure-operation parameter. Deciding about the request for exclusive secure execution of a secure code segment of the program code on the at least one processor core may be performed at least based on the secure-operation parameter and/or a duration of the exclusive secure execution requested.

If the secure-operation parameter is below a predefined threshold value, i.e., the thread has a high priority for exclusive secure execution, then the process may execute step S106, where exclusive secure execution is performed by setting the at least one processor core to exclusive secure execution for the secure code segment, executing the secure code segment on the at least one processor core uninterruptably and finally, wiping an architected and non-architected state from the least one cache storage or a register or a memory of the at least one processor core.

After finishing exclusive secure execution, in step S108, the secure-operation parameter of the first thread is increased at least based on the uninterrupted secure execution time of the first thread, thus reducing the priority of the thread for further exclusive secure execution.

Alternatively, or additionally, in step S110, the secure-operation parameter of other threads except the first thread may be decreased at least based on the uninterrupted secure execution time of the first thread. This increases the priority of the other threads for getting a request for exclusive secure execution to be granted.

Thus, step S110 may be optional. In an alternative embodiment yet, it may nevertheless be performed after step S108 has finished.

Updating the secure-operation parameter of the first thread after exiting the exclusive secure execution mode may be achieved under hardware control.

Alternatively, the secure-operation parameter of the first thread may be updated after exiting the exclusive secure execution mode by a hypervisor code.

Next, in step S112, the at least one processor core is set to the first execution mode for program code on the at least one processor core in order to continue with normal execution.

If at the check described above in step S104, the secure-operation parameter is not below a predefined threshold value, processing is switched to another thread in step S114.

Figure 2:
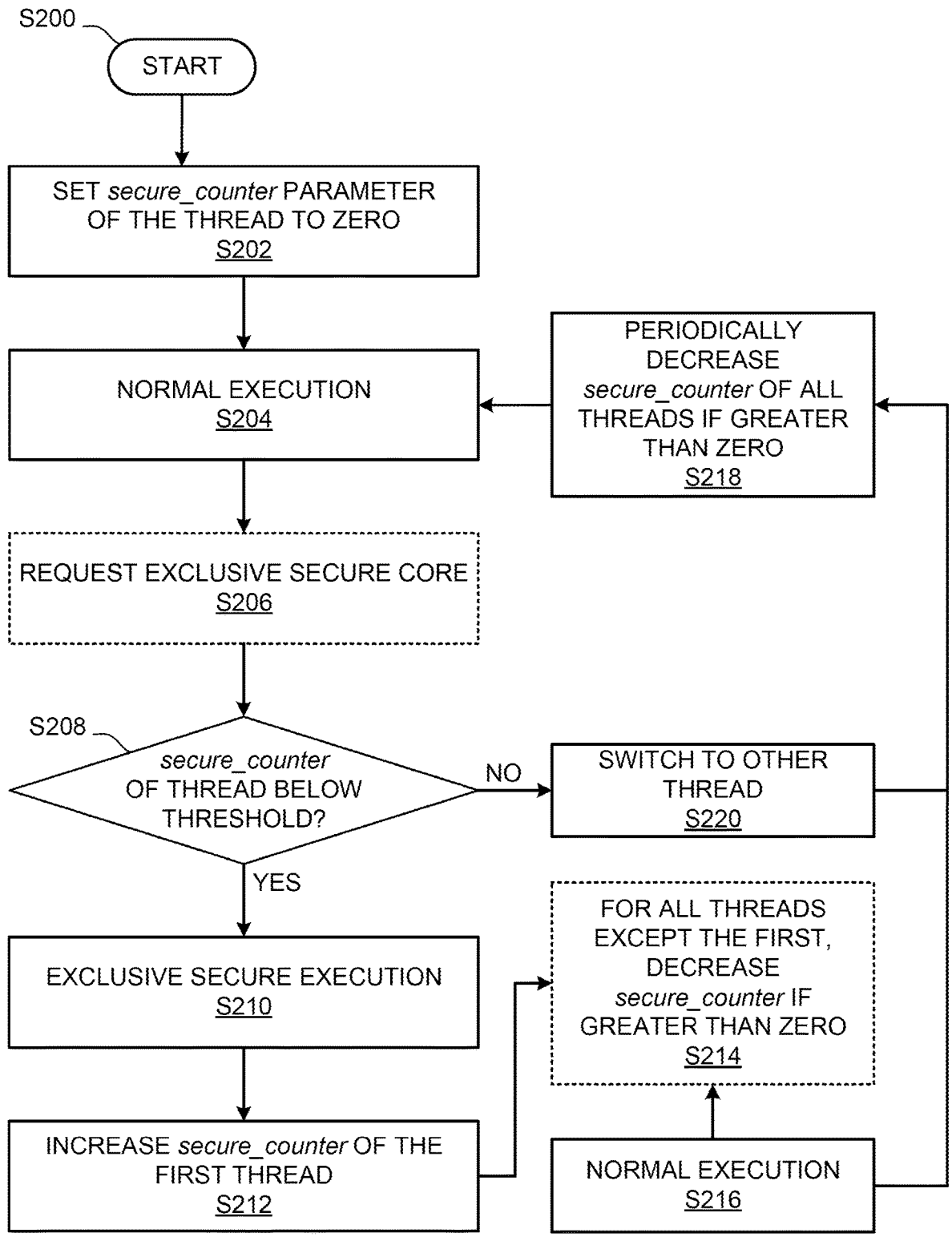
FIG. 2 depicts a flow chart of the computer implemented method for scheduling a secure code segment on a processor core of a processing unit between threads according to a further embodiment of the invention.

FIG. 2 depicts a flow chart of the computer implemented method for scheduling a secure operation of a secure code segment on a processor core of a processing unit 216 according to a further embodiment of the invention.

The secure-operation parameter in this embodiment is implemented as secure_counter, taking into account a number of secure execution events by the same thread or a time of a duration of an exclusive secure execution period. That means that after having accomplished an exclusive secure execution period on the processor core, the secure-operation parameter may be increased by one or by a time period of a duration of an exclusive secure execution.

The process flow may start at step S200. First, in step S202, the secure-operation parameter of the current thread, known as secure_counter, in this embodiment is set to zero.

In step S204, first execution as a normal execution of the operating instructions of the thread is performed.

Next, in step S206, a request for an exclusive secure execution is placed by the thread.

In step S208, a check may be made if secure_counter of the thread is below a secure-operation threshold named secure_limit, which means the thread has a high priority for an exclusive secure operation to be granted.

If secure_counter of the thread is below the threshold, the process moves to step S210 and exclusive secure execution is set.

After finishing exclusive secure execution, in step S212, secure_counter of the first thread is increased by one or by a time period of the duration of the exclusive secure execution, thus reducing a priority of the thread.

Step S214 may be an optional alternative to step S212 or an additional step, where secure_counter of all threads, but excluding the currently processed first thread, may be decreased correspondingly, if secure_counter of those threads is greater than zero. This increases the priority of the other threads for getting a request for exclusive secure execution to be granted.

Then, in step S216, the processor core returns to normal execution.

If, at the check in step S208, secure_counter of the thread is not below the predefined secure_limit threshold, meaning that the thread has a low priority for exclusive secure operation, processing is switched to another thread in step S220.

After returning to normal execution in step S216 or after switching to another thread in step S220, secure_counter of all threads is periodically decreased in step S218, if secure_counter of the corresponding thread is greater than zero, and normal execution is continued in step S204. A time period may be defined for decreasing secure_counter, which may be every minute or another appropriate time interval.

FIG. 3 depicts an example embodiment of a data processing system 210 for executing a method according to the invention. The data processing system 210 comprises a computer system 212 for executing the proposed method according to an embodiment of the invention.

The computer system 212 is configured for scheduling a secure code segment on a processor core of a processing unit 216 between threads, wherein the processing unit 216 is configured with at least one processor core with at least one cache storage. The computer system 212 comprises at least one processor unit 216 with at least one processor core with at least one cache storage. The processor core is configured to running a first execution mode for executing program code on the at least one processor core and is executing a program code of operating instructions of a thread on the at least one processor core. A secure-operation parameter is defined for at least one of the threads controlling a request for exclusive secure execution of a secure code segment of the program code on the at least one processor core.

The computer system 212 is configured to perform a method, at least comprising: (i) a first thread requesting exclusive secure execution of a secure code segment of the program code on the at least one processor core; (ii) checking the request based on the secure-operation parameter; (iii) if the secure-operation parameter is below a predefined threshold value (iii.1) setting the at least one processor core to exclusive secure execution for the secure code segment; (iii.2) executing the secure code segment on the at least one processor core uninterruptably; (iii.3) wiping an architected and non-architected state from the at least one processor core; (iii.4) increasing the secure-operation parameter of the first thread at least based on the uninterrupted secure execution time of the first thread or, decreasing a secure-operation parameter of other threads except the first thread at least based on the uninterrupted secure execution time of the first thread, if the secure-operation parameter is greater than the predefined threshold value; (iii.5) setting the at least one processor core to the first execution mode for program code on the at least one processor core; (iii.6) periodically resetting the secure-operation parameter; else switching to another thread.

The computer system 212 may be configured to decrease the secure-operation parameter of other threads except the first thread at least based on the uninterrupted secure execution time of the first thread.

The computer system further may be configured to decrease the secure-operation parameter of all threads in periodic time intervals.

The computer system further may be configured to update the secure-operation parameter of the first thread after exiting the exclusive secure execution mode under hardware control.

The computer system further may be configured to update the secure-operation parameter of the first thread after exiting the exclusive secure execution mode by a hypervisor code.

The computer system further may be configured to decide about the request for exclusive secure execution of a secure code segment of the program code on the at least one processor core at least based on the secure-operation parameter and/or a duration of the exclusive secure execution requested.

The secure-operation parameter may be implemented as a priority parameter of the thread.

The secure-operation parameter further may be implemented based on a counter of exclusive secure executions of a thread.

The first execution mode of the processor core may be a simultaneous multithreading mode.

Operating instructions may be implemented on a virtual machine or in a container. The computer system further may be configured to request exclusive secure execution of a secure code segment of the program code on a virtual machine or in a container.

Referring now to FIG. 3, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor unit 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random-access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further exemplary embodiments of the present disclosure are set out in the following numbered clauses:

Numbered clause 1: A computer implemented method for scheduling a secure code segment on a processor core of a processing unit (216) between threads, wherein the processing unit (216) is configured with at least one processor core for running a first execution mode for executing program code on the at least one processor core and executing a program code of operating instructions of a thread on the at least one processor core, wherein a secure-operation parameter is defined for at least one of the threads controlling a request for exclusive secure execution of a secure code segment of the program code on the at least one processor core, the method at least comprising:

requesting, by a first thread, exclusive secure execution of a secure code segment of the program code on the at least one processor core;
checking the request based on the secure-operation parameter;
setting the at least one processor core to exclusive secure execution for the secure code segment when the secure-operation parameter is below a predefined threshold value;
executing the secure code segment on the at least one processor core uninterruptably;
wiping an architected state and a non-architected state from the at least one processor core;
increasing the secure-operation parameter of the first thread at least based on the uninterrupted secure execution time of the first thread;
setting the at least one processor core to the first execution mode for executing program code on the at least one processor core;
periodically resetting the secure-operation parameter;
switching to another thread when the secure-operation parameter is greater than the predefined threshold value.

Numbered clause 2: The method according to numbered clause 1, further decreasing the secure-operation parameter, when the secure-operation parameter is below the predefined threshold value, of other threads except the first thread at least based on the uninterrupted secure execution time of the first thread.

Numbered clause 3: The method according to numbered clause 1 or 2, wherein the secure-operation parameter of all threads is decreased in periodic time intervals.

Numbered clause 4: The method according to any one of numbered clauses 1 to 3, wherein the secure-operation parameter of the first thread is updated after exiting the exclusive secure execution mode under hardware control.

Numbered clause 5: The method according to any one of numbered clauses 1 to 4, wherein the secure-operation parameter of the first thread is updated after exiting the exclusive secure execution mode by a hypervisor code.

Numbered clause 6: The method according to any one of numbered clauses 1 to 5, further deciding about the request for exclusive secure execution of a secure code segment of the program code on the at least one processor core at least based on the secure-operation parameter and/or a duration of the exclusive secure execution requested.

Numbered clause 7: The method according to any one of numbered clauses 1 to 6, wherein the secure-operation parameter is implemented as a priority parameter of the thread.

Numbered clause 8: The method according to any one of numbered clauses 1 to 7, wherein the secure-operation parameter is implemented based on a counter of exclusive secure executions of a thread.

Numbered clause 9: The method according to any one of numbered clauses 1 to 8, wherein the first execution mode for executing program code on the processor core is a simultaneous multithreading mode.

Numbered clause 10: The method according to any one of numbered clauses 1 to 9, wherein operating instructions are implemented on a virtual machine or in a container.

Numbered clause 11: The method according to numbered clause 10, further requesting exclusive secure execution of a secure code segment of the program code on a virtual machine or in a container.

Numbered clause 12: A computer system (212) for scheduling a secure code segment on a processor core of a processing unit (216) between threads, wherein the processing unit (216) is configured with at least one processor core comprising at least one processor unit (216) with at least one processor core, the processor core being configured to running a first execution mode for executing program code on the at least one processor core and executing a program code of operating instructions of a thread on the at least one processor core, wherein a secure-operation parameter is defined for at least one of the threads controlling a request for exclusive secure execution of a secure code segment of the program code on the at least one processor core, wherein the computer system (212) is configured to perform a method according to any one of numbered clauses 1 to 11, at least comprising:
a first thread requesting exclusive secure execution of a secure code segment of the program code on the at least one processor core;
checking the request based on the secure-operation parameter;
setting the at least one processor core to exclusive secure execution for the secure code segment when the secure-operation parameter is below a predefined threshold value;
executing the secure code segment on the at least one processor core uninterruptably;
wiping an architected state and a non-architected state from the at least one processor core;
increasing the secure-operation parameter of the first thread at least based on the uninterrupted secure execution time of the first thread;
setting the at least one processor core to the first execution mode for program code on the at least one processor core;
periodically resetting the secure-operation parameter;
switching to another thread when the secure-operation parameter is greater than the predefined threshold value.

Numbered clause 13: The computer system according to numbered clause 12, being configured to decrease the secure-operation parameter, when the secure-operation parameter is below the predefined threshold value; of other threads except the first thread at least based on the uninterrupted secure execution time of the first thread.

Numbered clause 14: The computer system according to numbered clause 12 or 13, being configured to decrease the secure-operation parameter of all threads in periodic time intervals.

Numbered clause 15: The computer system according to any one of numbered clauses 12 to 14, being configured to update the secure-operation parameter of the first thread after exiting the exclusive secure execution mode under hardware control.

Numbered clause 16: The computer system according to any one of numbered clauses 12 to 15, being configured to update the secure-operation parameter of the first thread after exiting the exclusive secure execution mode by a hypervisor code.

Numbered clause 17: The computer system according to any one of numbered clauses 12 to 16, being configured to decide about the request for exclusive secure execution of a secure code segment of the program code on the at least one processor core at least based on the secure-operation parameter and/or a duration of the exclusive secure execution requested.

Numbered clause 18: The computer system according to any one of numbered clauses 12 to 17, wherein the secure-operation parameter is implemented as a priority parameter of the thread.

Numbered clause 19: The computer system according to any one of numbered clauses 12 to 18, wherein the secure-operation parameter is implemented based on a counter of exclusive secure executions of a thread.

Numbered clause 20: The computer system according to any one of numbered clauses 12 to 19, wherein the first execution mode for executing program code on the processor core is a simultaneous multithreading mode.

Numbered clause 21: The computer system according to any one of numbered clauses 12 to 20, wherein operating instructions are implemented on a virtual machine or in a container.

Numbered clause 22: The computer system according to clause 21, being configured to request exclusive secure execution of a secure code segment of the program code on a virtual machine or in a container.

Numbered clause 23: A computer program product for scheduling a secure code segment on a processor core of a processing unit (216) between threads, wherein the processing unit (216) is configured with at least one processor core for running a first execution mode for executing program code on the at least one processor core and executing a program code of operating instructions of a thread on the at least one processor core, wherein a secure-operation parameter is defined for at least one of the threads controlling a request for exclusive secure execution of a secure code segment of the program code on the at least one processor core, the computer program product comprising a computer readable storage medium having program instructions embodied therewith, the program instructions executable by the computer system (212) to cause the computer system (212) to perform a method according to any one of numbered clauses 1 to 11, comprising:
- a first thread requesting exclusive secure execution of a secure code segment of the program code on the at least one processor core;
- checking the request based on the secure-operation parameter;
- setting the at least one processor core to exclusive secure execution for the secure code segment when the secure-operation parameter is below a predefined threshold value;
- executing the secure code segment on the at least one processor core uninterruptably;
- wiping an architected state and a non-architected state from the at least one processor core;
- increasing the secure-operation parameter of the first thread at least based on the uninterrupted secure execution time of the first thread;
- setting the at least one processor core to the first execution mode for executing program code on the at least one processor core;
- periodically resetting the secure-operation parameter;
- switching to another thread if the secure-operation parameter is greater than the predefined threshold value.

Numbered clause 24: A data processing system (210) for execution of a data processing program (240) comprising computer readable program instructions for performing a method according to any one of numbered clauses 1 to 11.

Numbered clause 25: An integrated circuit for executing instructions for scheduling a secure code segment on a processor core of a processing unit between threads, wherein the processing unit is configured with at least one processor core comprising at least one processor unit with at least one processor core, the processor core being configured to running a first execution mode for executing program code on the at least one processor core and executing a program code of operating instructions of a thread on the at least one processor core, wherein a secure-operation parameter is defined for at least one of the threads controlling a request for exclusive secure execution of the secure code segment of the program code on the at least one processor core, wherein the integrated circuit is configured to perform a method according to any one of numbered clauses 1 to 11, comprising:
- requesting, by a first thread, exclusive secure execution of the secure code segment of the program code on the at least one processor core;
- checking the request based on the secure-operation parameter;
- setting the at least one processor core to exclusive secure execution for the secure code segment when the secure-operation parameter is below a predefined threshold value;
- executing the secure code segment on the at least one processor core uninterruptably;
- wiping an architected state and a non-architected state from the at least one processor core;
- increasing the secure-operation parameter at least based on an uninterrupted secure execution time of the first thread;
- setting the at least one processor core to the first execution mode for executing program code on the at least one processor core;
- switching to a second thread when the secure-operation parameter is greater than the predefined threshold value; and
- periodically resetting the secure-operation parameter.

What is claimed is:

1. A computer-implemented method for scheduling a secure code segment on a processor core of a processing unit between threads, wherein the processing unit is configured with at least one processor core for running a first execution mode for executing program code on the at least one processor core and executing a program code of operating instructions of a thread on the at least one processor core, wherein a secure-operation parameter is defined for each of a plurality of threads, including a first thread and one or more other threads, at least one of the plurality of threads controlling a request for exclusive secure execution of the secure code segment of the program code on the at least one processor core, the method comprising:
   - requesting, by a first thread, exclusive secure execution of the secure code segment of the program code on the at least one processor core;
   - checking the request based on the secure-operation parameter of/for the first thread;
   - setting the at least one processor core to exclusive secure execution for the secure code segment when the secure-operation parameter is below a predefined threshold value of/for the first thread;
   - executing the secure code segment on the at least one processor core uninterruptedly;
   - wiping an architected state and a non-architected state from at least one cache storage, register, or memory of the at least one processor core;
   - increasing the secure-operation parameter of/for the first thread, based on at least an uninterrupted secure execution time of the first thread;

setting the at least one processor core to the first execution mode for executing program code on the at least one processor core;

periodically resetting the secure-operation parameter of/for the first thread; and switching to a second thread when the secure-operation parameter of/for the first thread is greater than the predefined threshold value.

2. The computer-implemented method of claim 1, wherein the secure-operation parameter for each of the plurality of threads is decreased in periodic time intervals.

3. The computer-implemented method of claim 1, wherein the secure-operation parameter of/for the first thread is updated after exiting the exclusive secure execution mode under hardware control.

4. The computer-implemented method of claim 1, wherein the secure-operation parameter of/for the first thread is updated after exiting the exclusive secure execution mode by a hypervisor code.

5. The computer-implemented method of claim 1, further comprising:

deciding about the request for exclusive secure execution of a secure code segment of the program code on the at least one processor core at least based on the secure-operation parameter and a duration of the request.

6. The computer-implemented method of claim 1, wherein the secure-operation parameter is implemented as a priority parameter for each of the plurality of threads.

7. The computer-implemented method of claim 1, wherein the secure-operation parameter is implemented based on a counter of exclusive secure executions for each of the plurality of threads.

8. The computer-implemented method of claim 1, wherein the first execution mode for executing program code on the processor core is a simultaneous multithreading mode.

9. The computer-implemented method of claim 1, wherein operating instructions are implemented on a virtual machine or in a container.

10. The computer-implemented method of claim 9, further comprising:

requesting exclusive secure execution of a secure code segment of the program code on the virtual machine or in the container.

11. A computer system for scheduling a secure code segment on a processor core of a processing unit between threads, wherein the processing unit is configured with at least one processor core, the computer system comprising at least one processor unit with at least one processor core, the processor core being configured to running a first execution mode for executing program code on the at least one processor core and executing a program code of operating instructions of a thread on the at least one processor core, wherein a secure-operation parameter is defined for each of a plurality of threads, including a first thread and one or more other threads, at least one of the plurality of threads controlling a request for exclusive secure execution of the secure code segment of the program code on the at least one processor core, wherein the computer system is configured to perform a method comprising:

requesting, by a first thread, exclusive secure execution of the secure code segment of the program code on the at least one processor core;

checking the request based on the secure-operation parameter of/for the first thread;

setting the at least one processor core to exclusive secure execution for the secure code segment when the secure-operation parameter is below a predefined threshold value of/for the first thread;

executing the secure code segment on the at least one processor core uninterruptedly;

wiping an architected state and a non-architected state from at least one cache storage, register, or memory of the at least one processor core;

increasing the secure-operation parameter of/for the first thread, based on at least an uninterrupted secure execution time of the first thread;

setting the at least one processor core to the first execution mode for executing program code on the at least one processor core;

periodically resetting the secure-operation parameter of/for the first thread; and switching to a second thread when the secure-operation parameter of/for the first thread is greater than the predefined threshold value.

12. The computer system of claim 11, being configured to decrease the secure-operation parameter for each of the plurality of threads in periodic time intervals.

13. The computer system of claim 11, being configured to update the secure-operation parameter of/for the first thread after exiting the exclusive secure execution mode under hardware control.

14. The computer system of claim 11, being configured to update the secure-operation parameter of/for the first thread after exiting the exclusive secure execution mode by a hypervisor code.

15. The computer system of claim 11, being configured to decide about the request for exclusive secure execution of the secure code segment of the program code on the at least one processor core at least based on the secure-operation parameter and a duration of the request.

16. The computer system of claim 11, wherein the secure-operation parameter is implemented as a priority parameter for each of the plurality of threads.

17. The computer system of claim 11, wherein the secure-operation parameter is implemented based on a counter of exclusive secure executions of each of the plurality of threads.

18. The computer system of claim 11, wherein the first execution mode for executing program code on the processor core is a simultaneous multithreading mode.

19. The computer system of claim 11, wherein operating instructions are implemented on a virtual machine or in a container.

20. The computer system of claim 19, being configured to request exclusive secure execution of the secure code segment of the program code on the virtual machine or in the container.

21. A computer program product for scheduling a secure code segment on a processor core of a processing unit between threads, wherein the processing unit is configured with at least one processor core for running a first execution mode for executing program code on the at least one processor core and executing a program code of operating instructions of a thread on the at least one processor core, wherein a secure-operation parameter is defined for each of a plurality of threads, including a first thread and one or more other threads, at least one of the plurality of threads controlling a request for exclusive secure execution of the secure code segment of the program code on the at least one processor core, the computer program product comprising a computer readable storage medium having program instructions embodied therewith, the program instructions executable by a computer system to cause the computer system to perform a method comprising:
  requesting, by a first thread, exclusive secure execution of the secure code segment of the program code on the at least one processor core;
  checking the request based on the secure-operation parameter of/for the first thread;
  setting the at least one processor core to exclusive secure execution for the secure code segment when the secure-operation parameter is below a predefined threshold value of/for the first thread;
  executing the secure code segment on the at least one processor core uninterruptedly;
  wiping an architected state and a non-architected state from at least one cache storage, register, or memory of the at least one processor core;
  increasing the secure-operation parameter of/for the first thread, based on at least an uninterrupted secure execution time of the first thread;
  setting the at least one processor core to the first execution mode for executing program code on the at least one processor core;
  periodically resetting the secure-operation parameter of/for the first thread; and
  switching to a second thread when the secure-operation parameter of/for the first thread is greater than the predefined threshold value.

22. A data processing system for execution of a data processing program comprising computer readable program instructions for performing the computer-implemented method of claim 1.

23. An integrated circuit for executing instructions for scheduling a secure code segment on a processor core of a processing unit between threads, wherein the processing unit is configured with at least one processor core, the integrated circuit comprising at least one processor unit with at least one processor core, the processor core being configured to running a first execution mode for executing program code on the at least one processor core and executing a program code of operating instructions of a thread on the at least one processor core, wherein a secure-operation parameter is defined for each of a plurality of threads, including a first thread and one or more other threads, at least one of the plurality of threads controlling a request for exclusive secure execution of the secure code segment of the program code on the at least one processor core, wherein the integrated circuit is configured to perform a method comprising:
  requesting, by a first thread, exclusive secure execution of the secure code segment of the program code on the at least one processor core;
  checking the request based on the secure-operation parameter of/for the first thread;
  setting the at least one processor core to exclusive secure execution for the secure code segment when the secure-operation parameter is below a predefined threshold value of/for the first thread;
  executing the secure code segment on the at least one processor core uninterruptedly;
  wiping an architected state and a non-architected state from at least one cache storage, register, or memory of the at least one processor core;
  increasing the secure-operation parameter of/for the first thread, based on at least an uninterrupted secure execution time of the first thread;
  setting the at least one processor core to the first execution mode for executing program code on the at least one processor core;
  periodically resetting the secure-operation parameter of/for the first thread; and
  switching to a second thread when the secure-operation parameter of/for the first thread is greater than the predefined threshold value.

* * * * *